US008381197B2

(12) United States Patent
Meenakshisundaram et al.

(10) Patent No.: US 8,381,197 B2
(45) Date of Patent: Feb. 19, 2013

(54) METHOD AND SYSTEM FOR TESTING A SOFTWARE DEVELOPMENT ACTIVITY

(75) Inventors: Krishnamoorthy Meenakshisundaram, Chennai (IN); Shyamala Jayaraman, Chennai (IN); Parthasarathy Sundararajan, Chennai (IN); Raghuram Devalla, Chennai (IN); Srinivasan Ramaswamy, Chennai (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 838 days.

(21) Appl. No.: 12/499,077

(22) Filed: Jul. 7, 2009

(65) Prior Publication Data

US 2009/0300585 A1 Dec. 3, 2009

Related U.S. Application Data

(63) Continuation-in-part of application No. 11/072,040, filed on Mar. 4, 2005, now abandoned.

(51) Int. Cl.
*G06F 9/44* (2006.01)
(52) U.S. Cl. ........................................................ 717/135
(58) Field of Classification Search ........... 717/124–135
See application file for complete search history.

(56) References Cited

U.S. PATENT DOCUMENTS

| 6,725,399 | B1 * | 4/2004 | Bowman | 714/38.14 |
| 6,966,013 | B2 * | 11/2005 | Blum et al. | 714/38.1 |
| 7,644,368 | B2 * | 1/2010 | Pins | 715/762 |

OTHER PUBLICATIONS

SAP AG, "SAP Solution Manager 3.1—Strategic Background and Functional Overview", 2003, SAP AG, pp. 1-46.*
Mikko Rossi, "Software testing design and implementation in a small software company", 2003, Master's thesis, Lappeenranta University of Technology, Finland, pp. i, 1-69.*

* cited by examiner

*Primary Examiner* — Ted T Vo
(74) *Attorney, Agent, or Firm* — Prakash Nama; Global IP Services, PLLC

(57) ABSTRACT

A system and method for testing a software development activity of an enterprise application is disclosed. In one embodiment, the method includes obtaining a software structure specification for an enterprise application and automatically generating test plans using the software structure specification. The method also includes automatically determining at least one test path in each test plan using the software structure specification, and automatically deriving a plurality of test cases using each test path. Further, the method includes executing each of the plurality of test cases and recording test results.

23 Claims, 14 Drawing Sheets

METHOD AND SYSTEM FOR TESTING A SOFTWARE DEVELOPMENT ACTIVITY

RELATED APPLICATIONS

Benefit is claimed under 35 U.S.C. 120 to U.S. Non Provisional application Ser. No. 11/072,040, entitled "METHOD AND SYSTEM FOR TESTING SOFTWARE DEVELOPMENT ACTIVITY" by inventor Krishnamoorthy Meenakshisundaram et al., filed Mar. 4, 2005, which is herein incorporated in its entirety by reference for all purposes.

FIELD OF THE INVENTION

Embodiments of the present invention relate generally to the technical field of software development and, in one example embodiment, to methods and systems to perform planning and performing testing for software modules within an automated development system.

BACKGROUND

Software testing and automating software testing is one of the key topics in software engineering. Typical sets of activities performed in software testing are test plan creation related to the objective, identifying test cases, executing test cases against the software, and verification and certifying the software based on execution results.

Types or classes of testing may be listed as business level system/acceptance testing, integration level testing for checking co-existence with other parts, unit testing for certifying basic units of development, and technical or performance testing to verify the stability and the loading characteristics. Many tools are available today to perform these activities in specific domains.

Issues faced by the software testing groups are ensuring that the set of specifications available to testers are reliable with respect to implementation, identifying all the paths through the software flow to create test cases, identification of support drivers to aid in testing the units independently, and identification of data requirements and creating an execution plan. These issues faced are primarily due to the lack of specifications that are structured and reliable to enable test planners to come up with a comprehensive plan.

Moreover, when changes are made to the software, the relation to the cases that need to be tested is created manually and is prone to oversights or increase in the testing load when over cautious. Another key problem is, since the testing group may be part of the development, the issue of knowledge creation needed to write valid test plans is a major issue. In most of the projects, a lot of resources are consumed in communicating expected behavior to the testing group.

Software developed for many applications are tested with provision for manual entry and logging of these test cases in documents. These documents need to have naming convention in the test cases. There needs to be a sequence to execute them and any software issue arising out of this testing is also manually communicated. Files that have this data are retained as soft copies and updated in a secure storage system; otherwise they are printed as hard copies and retained for reference. An ability to streamline this testing process and collect the both sequence and results automatically enabling a robust software release with proper testing completion is not accomplished without manual support.

A test plan generated for a conventional development process is different from the test plan that used for a maintenance or enhancement release. This test plan for an enhancement release needs analysis of the existing test case and execution dependencies that will provide a sufficient and complete list of test cases in the test plan for execution.

Testing of any developed software can be done in a number of ways. Streamlining the testing process having a well documented schedule for the test, prior to its initiation is a major overhead for most organizations. The awareness that generally testing takes more time than development justifies the complexity behind the process. To ensure an integrated environment is provided for users to record their testing sequences, automating the process of testing and also provide estimate for the testing to be done is a major hurdle.

It is very hard to formally identify all the paths that need to be tested. The paths also need to be classified as business system level cases, integration cases and Unit cases based on the staged testing approach. For technical testing there is a need to create volume testing plans to validate all the hot spots in the implementation.

List of issues that need to be addressed are representation of software specifications in a structured format that is understood by the testing group, creating an ability to view and pick the various paths through the software structure, creating an ability to classify and record cases as part of a plan, and support for creating execution of test cases and the results.

BRIEF DESCRIPTION OF THE DRAWINGS

FIG. 10A is a user interface view showing generation of test cases associated with a test path at a user interface level, in accordance with one example embodiment of the present invention.

FIG. 10B is a user interface view for managing of the automatically generated test cases at each level, in accordance with one example embodiment of the present invention.

FIG. 10C is a user interface view showing results of testing operations using automatically generated test cases, in accordance with one example embodiment of the present invention.

DETAILED DESCRIPTION

A method and system for testing a software development activity for an enterprise application is disclosed. In the following description, for purposes of explanation, numerous specific details are set forth in order to provide a thorough understanding of the present invention. It will be evident, however, to one skilled in the art that the present invention may be practiced without these specific details.

The terms 'system level', 'business process level' and 'first level' are used interchangeably throughout the document. The terms 'integrated services level', 'component level' and 'second level' are used interchangeably throughout the document. The terms 'unit level', 'user interface level' and 'third level' are used interchangeably throughout the document. The terms 'task', 'business task' and 'action' are used interchangeably throughout the document. Also, the terms 'test cases' and 'test case data' are used interchangeably throughout the document.

Figure 1A:
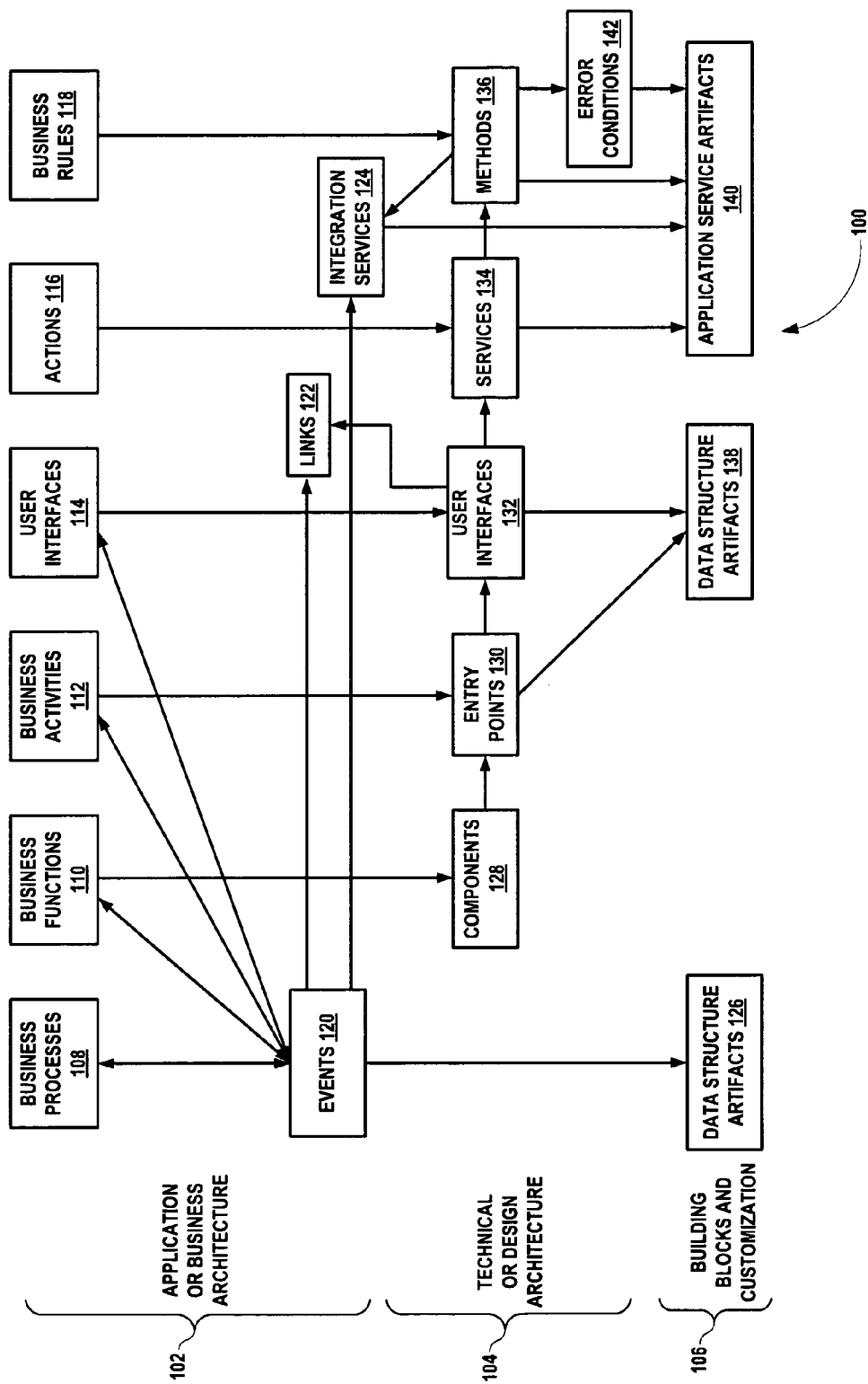
FIG. 1A is a schema for gathering requirements and for creating and managing enterprise software from the gathered requirements, in accordance with one example embodiment of the present invention.

FIG. 1A is a schema 100 for gathering requirements and for creating and managing enterprise software from the gathered requirements in accordance with one example embodiment of the present invention. The schema or software structure specification 100 includes multiple levels of abstraction of requirements. The first level 102 is an application or business architecture level. The first level 102 is used to define the high level requirements in context relevant syntax. The multiple levels of abstraction of requirements are stored in a database schema form in one embodiment, such that lower levels, progressing toward actual coding are linked to higher levels. A second level 104 is used to represent a technical or design architecture of the first level 102. The second level 104 serves as an intermediate link between the first level 102 and a third level 106 that represent actual building blocks and technology specific customization.

The first level 102 is a process expression level. The first level 102 includes a plurality of elements or units, each of which stores various aspects of specifications derived from the requirements and software built to those specifications. In some embodiments, the first level 102 includes business processes 108 that define requirements at a level compatible with thinking processes of business-requirements experts. In some embodiments, the business processes 108 are divided into a first five units including business functions 110, business activities 112, user interfaces 114, actions 116, and business rules 118.

An example of a business process might be sales order processing for a business. The business functions 110 may include purchase requisitioning, approval and purchase order dispatch. The business activities 112 may include an acknowledgement, get best quote, release purchase order. The user interfaces 114 may be defined in terms of show all pending purchase orders for approval, an approval screen, and others. The actions 116 may include things like fetch next purchase order for approval, link to next page, send acknowledgement, or send rejection.

The business rules 118 may include things like "if no request, tell user x". As illustrated, the first level 102 contains a textual description of the business or other process to be implemented by a computer system or otherwise electronically. The descriptions take the form of text that is very relevant to one who is designing the business process. In one sense, it is an abstract representation of the actual code that will be written, but in another sense, it separates the structure of the implementation from the expression of the process.

The business processes 108 and associated events 120 represent operational flow across the organization for which the software is being developed. The events 120, in the form of entry and exit events to the constituent functions, activities, and user interfaces are connectors that define flow of control or interfaces between other units. The business activities 112 and their associated events 120 represent the operational flow across a unit within the organization. The user interfaces 114 and their associated events 120 represent specified interface map for the systems and software being developed.

Links 122 are formed from mapping of the events 120 that represent interconnections, or from user interfaces 132. Integration services 124 are formed from mapping of the events 120, the business rules 118, or methods 136. A second five units represent the design architecture 104, and include, in some embodiments, components 128 that represent the basic software units of this approach, entry points 130, user interfaces, 132, services 134, and methods 136.

In some embodiments, each one of the first five units is mapped to a corresponding one of the second five units, e.g., business functions 110 are mapped to components 128, business activities 112 are mapped to entry points 130, user interfaces 114 are mapped to user interfaces 132, actions 116 are mapped to services 134, and business rules 118 are mapped to methods 136. In some embodiments, error conditions 142 are provided for methods 136.

In some embodiments, the third level 106 includes building blocks and customization. Data structure artifacts 126 are generated from the events 120 and the components 128, user-interface artifacts 138 are generated from the entry points 130 and the user interfaces 132 of the second five units, and application service artifacts 140 are generated from the services 134 and the methods 136. In some embodiments, application service artifacts 140 are also generated from the integrations services 124 and the error conditions 142.

In accordance with above described embodiments, the schema 100 or the software structure specification drives testing efforts. The software structure specification is created to support testing requirements. The software structure specification serves as a backbone for creating test plans, deriving test cases for the various test paths and storing the derived test cases, executing the test cases and recording the execution results which are described in greater detail in FIG. 2.

With the process flow specification, all the business level test cases are derived by following the test paths; with user interface elements test execution instructions are created. With the logical flow specifications, test cases may be created at various levels depending on interconnection with other parts of the system. By associating into the release groups, the specification node elements that participate, specific test plan will be derived with the list of necessary test cases and the test execution support artifacts (test data, stubs) will be stored at the relevant node level.

With this approach, test planning group can use the structured knowledge repository to create and manage testing of large software systems. Fundamental to this approach is creating the repository with the facility to adorn this with the needed structures to support test planning and management. This approach also caters to selecting the test cases specific to a release or maintenance work based on the nodes affected by that work and selecting the relevant test plan items.

Figure 1B:
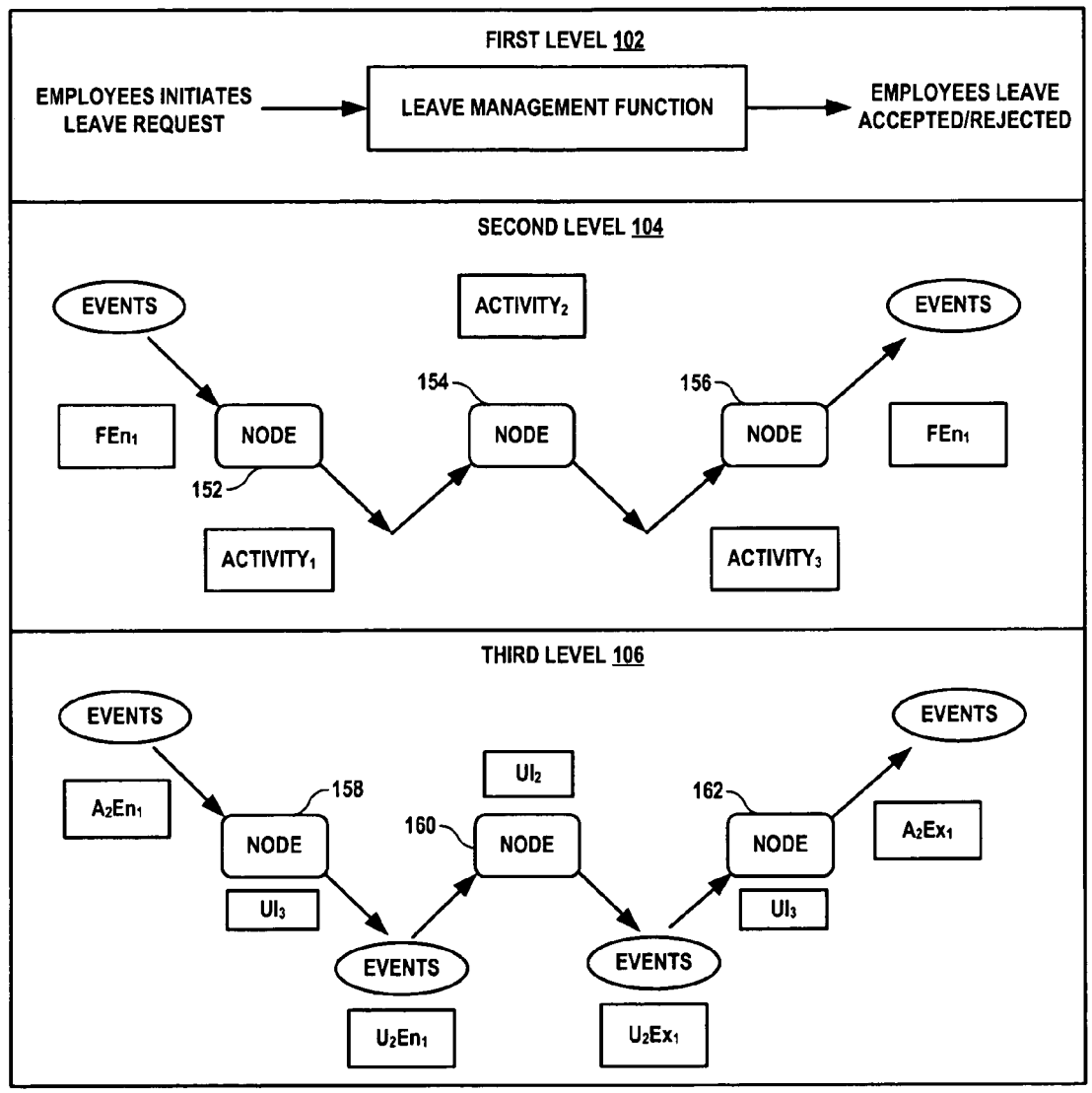
FIG. 1B represents exemplary connections within and across levels, which are used as the software is being developed, engineered and tested, in accordance with one example embodiment of the present invention.

FIG. 1B represents exemplary connections 150 within and across levels, which are used as the software is being developed, engineered and tested in accordance with one example embodiment of the present invention. A first level corresponding to the first level 102 in FIG. 1A in the diagram creates a process flow by depicting entry events and exit events to the constituent functions from/to other functions in the same process or across processes. The standard connective elements (which connect the standard architectural elements) are events that are triggered by and/or handled by the various architectural elements (FEn1, FEx1, AEn1, AEx1, UEn1, UEx1). FEn1 represents an entry event handled by function 1. FEx1 is an exit event generated by function 1. AEn1 is an entry event handled by activity 1. Events are represented by ovals in FIG. 1B. AEx1 is an exit event generated by activity 1. UEn1 is an entry event handled by User Interface 1. UEx1 is an exit event generated by user interface 1.

The second level 104 for activity flow uses the entry event for the corresponding functions as the start event to create the set of activities and interactions through events to reach the end events for the function. Each activity node 205152, 215154 and 220 156 is expanded along the same principles to depict the user interface (UI) flow needed to complete the activity. The next level 106 represents tasks at task nodes 225158, 160230 and 235162 on the UI and subsequently the business rules to be implemented for the tasks expanded. Events are again represented by ovals.

This approach creates a complete map of the system behavior up to the business rules/policies level and will be the driver for engaging with customers for whom the code is being written. The nodes translate to relevant nodes in engineering. The events that connect them are classified and translated to information-exchange events (these are implemented as UI look ups, and data look ups at the SP level for performing the validations), and transfer-of-control events (these are implemented as integration services across component boundaries and data updates across boundaries for local storage inside the component boundary).

Events are now described with respect to an example business process in FIG. 1B. An event is a stimulus that triggers a function/activity/user interface. The function/activity/user interface responds to the stimulus and results in an response. The stimulus is referred to as an entry event and the response as an exit event. An example of an entry event at the function level is "Employee initiates leave request." The function that responds to this stimulus is a leave-management business function.

An example of an exit event is "Employee leave request approved/rejected." UI lookups are user interfaces provided to look up certain reference information in the course of completing a transaction. For example, during the processing of a leave authorization, the supervisor could look up the leave balance of the employee. Data lookup is the reference information used to validate data in the database. An example of such lookup is the validation of employee eligibility for the type of leave applied for. Stored-procedure-level look up is used where multiple business rules need to be implemented in a common environment.

An event within the system querying for information is an information-exchange event, e.g., checking an available-to-promise date from a production schedule, or checking on vendor rating for a purchase order creation. A transfer-of-control event is an event within the system that transfers information and control to the next function in a business process, e.g., items ready for packing to be handled by the packing function, or invoice to be raised for item purchased to be handled by accounts payable.

The mapping of the nodes and events to the underlying engineering models complete the packaging and prepares for implementation. For new solutions, mapping is the analysis effort of deciding on the implementation mode for the events with the nodes already defined. Impact analyses or changes are recorded as a set of events that needs to be added or deleted or enhanced in terms of the information content. The mapping information is used to create the traced impact on the engineering model elements affected and forms the basis for the changes to be engineered into an existing solution. This component initiates the changes at the process-function level and can go in-depth until the business rules are implemented inside the software.

For a typical application, changes that can impact events at the process and/or activity level provide information for probing impact at the levels below. There can be changes which attribute to the flow and the node in specific. The specification of this attribute provides the connectors to be involved at both ends in an event-managed impact analysis. Subscription and publishing of the information is affected in this impact.

The user has the option of taking up the impacted change provided as side impact or ignore the suggested changes, based on his ability to assess the impact. An example of impact at the activity level would be flow change. This change flow will may result in user interface(s) that may have addition or deletion of controls/elements in the presentation and subsequent use of the data from these controls/elements in the processing area. So if it impacts the processing further down, the impact is identified by its engineering nodes that need modification. Implementation using business logic may change to accommodate this accepted/suggested modification.

In a case where the leave-management function interacts with the employee-handling function, there could be a change envisaged that the employee eligibility for different leaves is based on an employee type. This may leads to a change in the signature of the IE event connecting leave management and employee handling. This change in the event at the function interaction level is used to find the possible impact at other levels based on the mapping of this information exchange event at a function level to its implementation details and also to the events at activity, user-interface levels. This may lead to a change in the data exchange between the two user interfaces and also change in the service signature of the leave eligibility service.

The following advantages may result: a single context relevant diagram/syntax may be used for representing a business architecture. Its formal structure provides for persisting the business-architecture specification. Persistence is the storing of the specifications in a data base system so that it may be used by others at any other point in time. This results in a persistent blueprint for driving software engineering and the roll out of the finished information systems. It also allows business-impact analysis and implementation independence.

Figure 2:
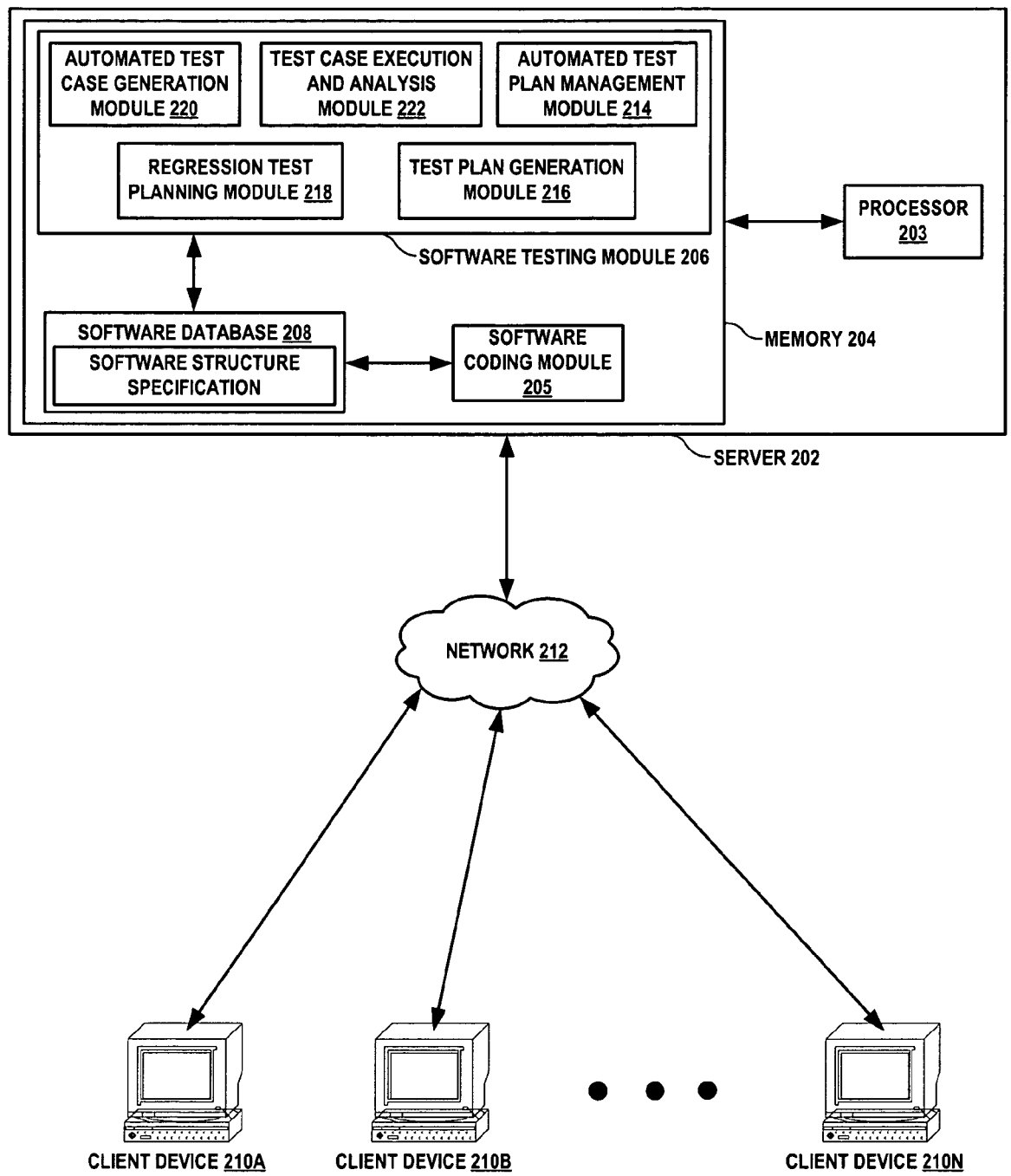
FIG. 2 is a block diagram depicting a system having a software development system in accordance with one example embodiment of the present invention.

FIG. 2 is a block diagram depicting a system 200 having a server 202 in accordance with one example embodiment of the present invention. The server 202 includes a processor 203 and a memory 204. The memory 204 includes a set of processing modules to perform development, maintenance and testing of applications and related processing modules. The set of processing modules may include in part a software coding module 205, a software testing module 206, and a software database 208. Further, as illustrated, client devices 210A-N communicate with the server 202 through a network 212. The client devices 210A-N communicate with the server 202 using a data transfer protocol for performing the development and testing activities. For example, the communications may be a serial connection, a modem connection, a hard-wired connection and a network connection.

While the example embodiment disclosed herein uses a client-server architecture, one skilled in the art will recognize that other architectures including a single processing system including all of the processing modules as well as a distributed processing system having a collection of different processing systems for each of the processing functions may be utilized without departing from the present invention as recited within the attached claims.

The software coding module 205 generates applications and related software modules that are part of software development activities. The applications and related software modules may include executable modules, source code, object code libraries and any other form of software modules used within a software development process. Further, the related software modules may be stored in the software database 208.

The software testing module 206 performs testing operations of the applications and related software modules during the software development process. As illustrated, the software testing module 206 includes a set of test related modules for performing the testing operations. The set of test related modules include an automated test plan management module 214, a test plan generation module 216, a regression test planning module 218, an automated test case generation module 220, and a test case execution and analysis module 222.

The automated test plan management module 214 automates management of all testing processes as part of an integrated approach to testing applications and software modules during the software development process. The test plan generation module 216 generates one or more test plans for use by the automated test case generation module 220 in generating test case data based on other information, e.g., extracted from the software structure specification 100. The regression test planning module 218 performs test plan analysis as software modules are modified following earlier testing operations to allow new testing to incorporate and benefit from information relating to the modifications being made.

The automated test case generation module 220 generates test case data for use in testing applications and software modules as part of the testing process. In one embodiment, the automated test case generation module 220 generates one or more test paths from the test plan and generates test cases from the generated test paths. The test case execution and analysis module 222 performs testing operations using the test case data generated by the automated test case generation module 220 as part of testing of software modules. The automated test generation module 220 also assists users in analysis of test result data that may be generated when test cases are executed. These modules operate together as part of the testing process and are all described in additional detail below.

Figure 3:
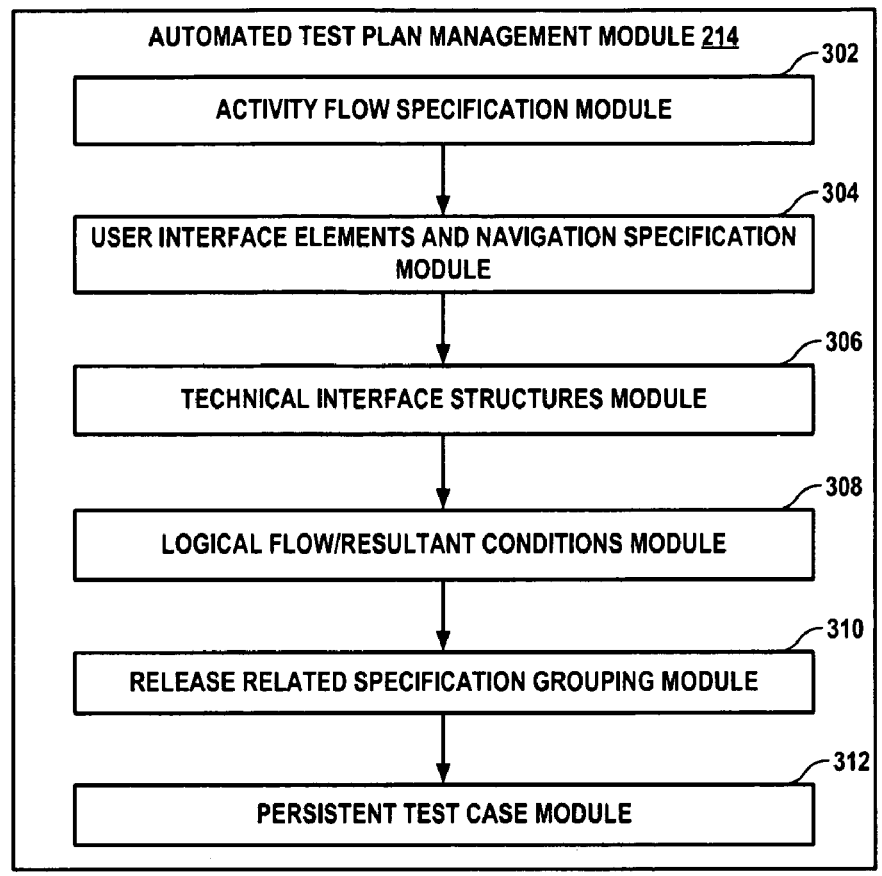
FIG. 3 is a block diagram depicting the automated test plan management module residing in the software development system in accordance with one example embodiment of the present invention.

FIG. 3 is a block diagram depicting the automated test plan management module 214 residing in the server 202 in accordance with one example embodiment of the present invention. A set of processing modules coordinate their functions to permit automated management of test plans throughout the entire development and testing process.

The automated test plan management module 214 includes an activity flow specification module 302 that provides the basis for a business level system testing. The automated test plan management module 214 also utilizes a user interface elements and navigation specifications module 304 to provide a basis for creating test execution instructions for a visual part of the enterprise application.

A technical interface structures module 306 provides a basis for creating test execution instructions for a non-visual part of the enterprise application. A logical flow and resultant conditions module 308 provides the basis for creating various level test cases associated with services. The automated test plan management module 214 also includes a release related specification grouping module 310 to aid in identifying grouping of release related specifications and related test cases relevant to a release. Finally, the automated test plan management module 214 includes a persisted test case module 312 to provide persistent test case data for use against relevant nodes in the software structure specification 100.

Figure 4:
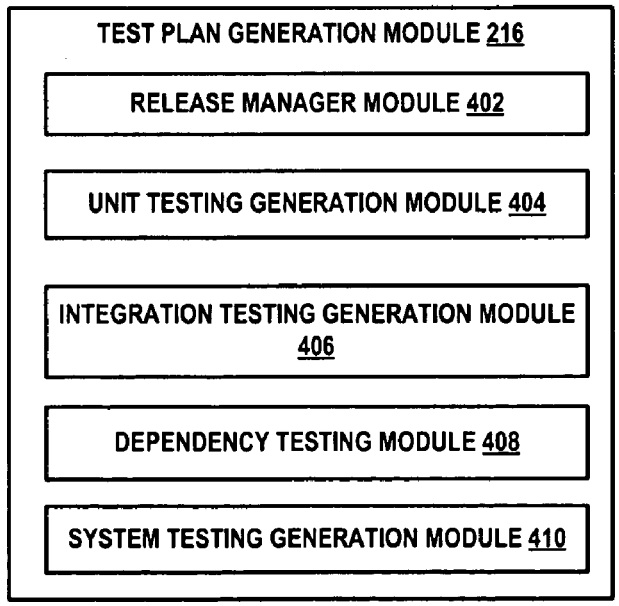
FIG. 4 is a block diagram depicting the test plan generation module residing in the software development system in accordance with one example embodiment of the present invention.

FIG. 4 is a block diagram depicting the test plan generation module 216 residing in the server 202 in accordance with one example embodiment of the present invention. The software structure specification 100 eases the testing process. Understanding semantics of information in the software structure specification 100 in the form of errors, validations that have been raised using user interface behavior, interaction between user interfaces, data between business objects and between processes, data masks, location specific validations, role specific validations, integration issues and environmental issues form the basis for a test plan.

Typically a release manager module 402 creates a version to be released in the context of a customer and project. The release versions are mapped to respective "Requirement Change Notices (RCN)", "Engineering Change Requests (ECR)" and "Implementation Change Orders (ICO). Testing is performed by a number of test engineers coordinated by a lead test engineer at a process level in case of unit testing.

For system testing, a process is carried out by a system testing generation module 410 for all the cases under the purview of the software development activity of an enterprise application. This holds true for a full version release as well as a hot fix release. A test plan collects initial information of the required hardware and software that needs to be provided to the test environment accounting for all in-depth details either as check lists if commonly used or specified as documentation. It also specifies the software structure specification 100 from where the objects that needs to be code generated, compiled and deployed for testing. This testing is performed in a unit testing generation module 404 and an integration testing generation module 406. All related information for retrieval of data pertaining to objects/artifacts is also collected. From the existing information in the software structure specification 100, activities are available for providing information to a user classified as error based test cases, user interface test cases and user specific test cases.

For all the test cases, the classification of what the test data will be is collected. There is also be some additional prerequisites that need to be carried out which is collected.

Events that are available in the software structure specification form the success test cases which are pulled in this testing cycle, based on either, affected artifacts in development or from the considered work list and the associated solutioning events. Additional facility that has been provided is available from documentation provided by the user, in the form of basic and alternate course of events at different levels. Collection of whether this course is an exception is also available. Relationship between test cases and the sequencing of these test cases are possible to arrive at dependency test cases using a dependency testing module 408.

The test management picking this information from documentation collects the resultant value to be verified. A test execution plan is drawn by a Lead Test Engineer that includes test cases derived out of the list given above for each version or sub-versions containing individual documents (requirement change notice, engineering change request and implementation change order). To inform you that test execution could happen for individual code sets like middle layer service execution alone, stored procedures, generation of XML from a web layer for transportation and verification with middle/application layer on integration is available. Typically function/component wise unit testing is seen in development where by integration related issues for an application is generated as a table for interaction and business objects for an application is associated with the process segment and data item information.

Once the test plan is generated, workflow ensures that the details for testing is sent as an email in addition to viewing as pending test jobs for a test engineer. The test engineer is provided with tools for automating the test process for the said test cases and records the results of the transaction set. Provision for different cycles of testing of the same test case (s) under different scenarios and consolidation of such information is also provided. Allocation of test engineers may also be changed during this course of different cycles of testing. Test details and results and suggested attributes at different levels are stored in the software database 208. This provides immense information for later stages of project life cycle when changes and integration issues have problems.

Figure 5:
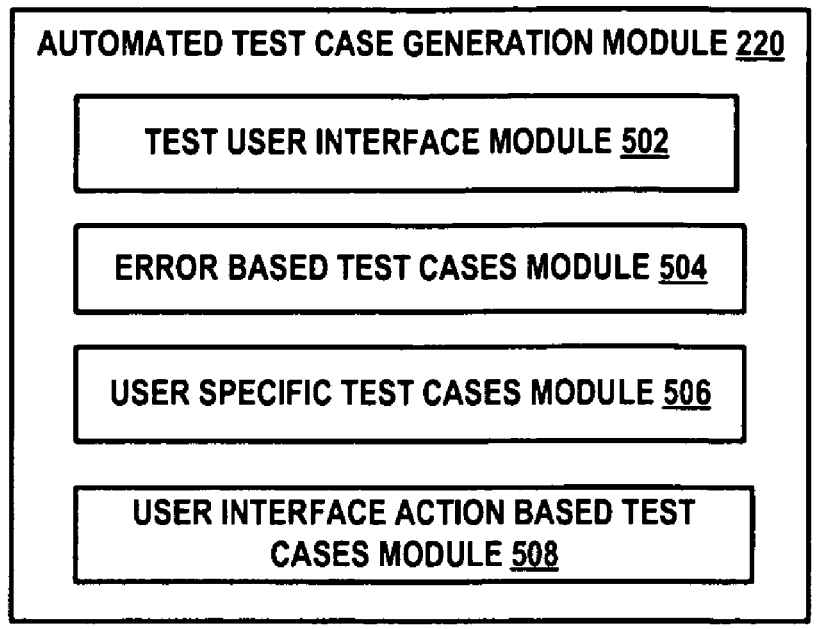
FIG. 5 is a block diagram depicting the automated test case generation module residing in the software development system in accordance with one example embodiment of the present invention.

FIG. 5 is a block diagram depicting the automated test case generation module 220 within the server 202 in accordance with one example embodiment of the present invention. The automated test case generation module 220 includes a test user interface module 502, an error based test case module 504, a user specific test cases module 506 and a user interface action based test cases module 508.

These modules provide test management function(s) that covers the list of test cases and test execution cycles that cover the list of test cases associated with each of the test execution sequence provided and/or collected as information. There are two typically ways by which the support to recording this information can be performed. The first and conventional way is provided through clear user interfaces that contain columns that support for provision of data related to different classification of test cases.

The different classifications identified are error/information messages based test cases, user interface action based test cases, user specific test cases enterable using a clearly provided user interface and rule based test cases. In all of these the user gets the benefit of defining his/her input data, prerequisites and final outcome as result using the provided user interfaces. These are generated in an excel sheet in a format identified as explained below that enables testing and logging of defects for follow up very easy.

Figure 6:
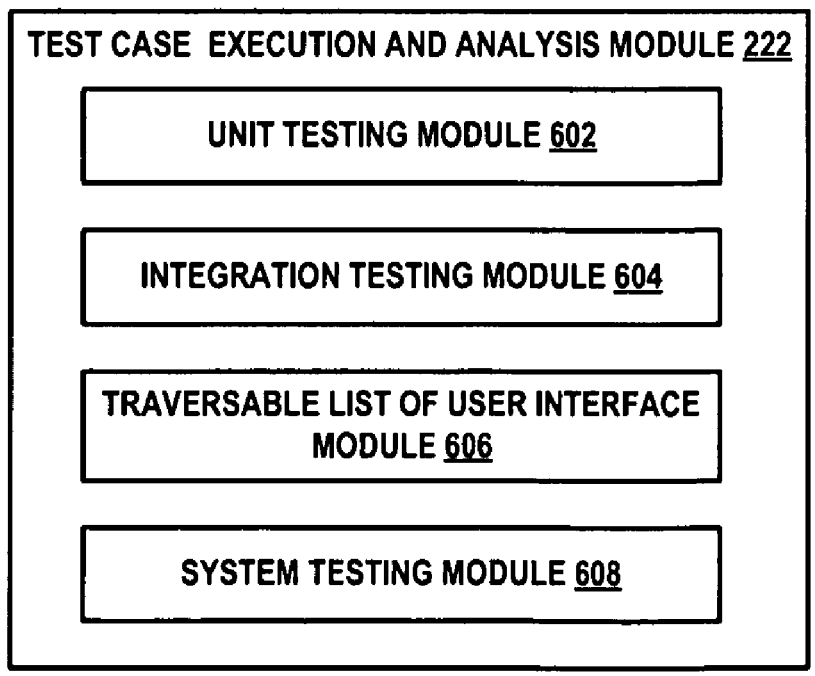
FIG. 6 is a block diagram depicting the test case execution and analysis module residing in the software development system in accordance with one example embodiment of the present invention.

FIG. 6 is a block diagram depicting the test case execution and analysis module 222 residing in the server 202 in accordance with one example embodiment of the present invention. The test case execution and analysis module 222 includes a unit testing module 602, a traversable list of user interfaces module 604, an integration testing module 606, and a system testing module 608.

One additional facility that has been built is the classification of the different kinds of test cases in broad levels as unit level testing, integration services level testing and system level testing. For integration services level testing and system level testing, the case of failure of the functionality is logged again in the list of test cases for testing. This is done as the cases require validation in further test cycles. The user also gets to log feedback as an addendum to the provided list of logged details for each test case executed and tested.

The users can also avail the facility of testing sequence through traversable prototype of the list of user interfaces. Data may be provided either initially or at a later point in time. These sequences in traversals are considered as the different test execution sequences and automated for testing at a later date. Scenario's based testing provides two interfaces. The first interface supports the recording of information for testing in the form of sequences in traversable user interfaces and actions on user interfaces with provisional data while the second interface supports playing this recorded information automatically and storing the results in the log file as well as in the software database for further proceeds.

In the above stated approach of providing data and also in the scenarios based execution sequences, the data modifications for testing is possible as both of them generate a spreadsheet. This spreadsheet contains the input and output data possible as columns wherein data can be provided or changed. This data can be used for execution of the test sequence to record the results in the log file as well as in the system for further usage.

Any testing on completion is supported by a test completion certificate, which is an acknowledgement by an appointed supervisor for a planned release. The supervisor is provided the facility to view all the results and inputs. In addition, the tested sequences are recorded as one set and optional execution without recording is displayed for a random verification.

Some additional testing at a business service level is provided as an application layer artifact to verify even intermediate values for a thorough testing. Incorporation of memory leakage testing of some of the commonly used infrastructure components identified using test planning is also performed. The user is also provided facilities for saying whether he/she needs testing the memory load, atomicity, concurrency, independence, deletion (ACID) tests for resource management server data and storage size verification and additional attributes for actual data semantics.

An impact analysis sheet is automatically generated on released products. This sheet contains the list of impacted artifacts and cases logged out of the purview of the main list of test cases. There is also a calculation of the actual effort in the time of the provided function points. Facility for overriding some of the unwanted failure test cases has been provided to ensure that this system is flexible for release but with proper documentation of the override.

Figure 7:
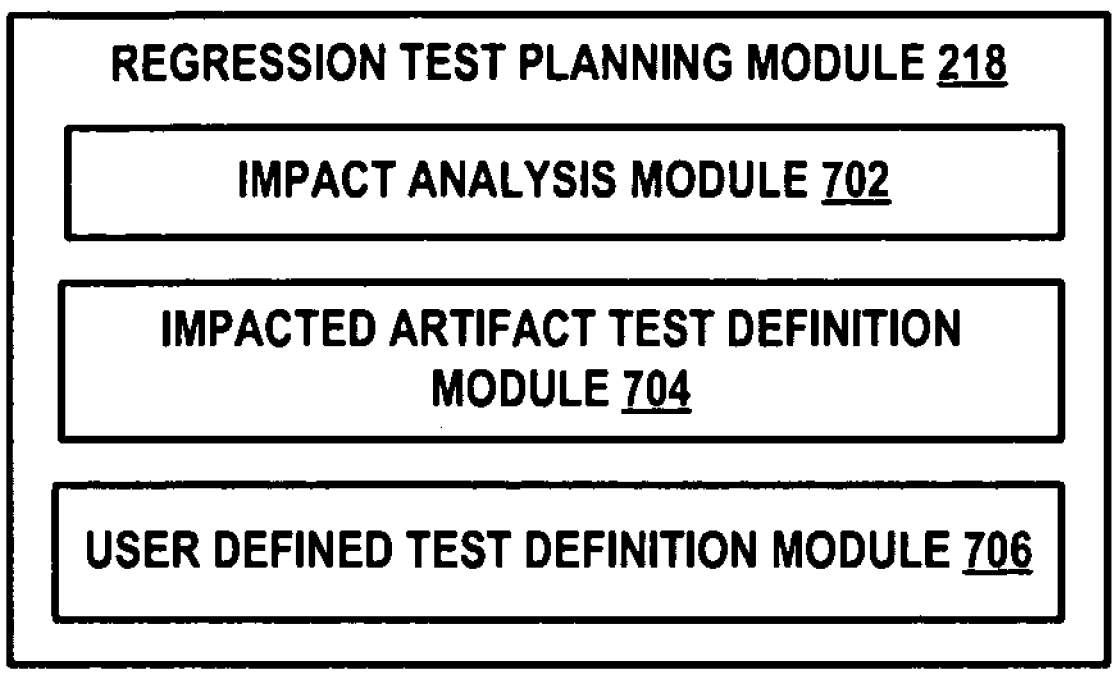
FIG. 7 is a block diagram depicting the regression test planning module residing in the software development system in accordance with one example embodiment of the present invention.

FIG. 7 is a block diagram depicting the regression test planning module 218 residing in the server 202 in accordance with one example embodiment of the present invention. The regression test planning module 218 performs its function using an impact analysis module 702, an impacted artifact test definition module 704, and a user defined test definition module 706. These modules provide a model based infrastructure utilizing large amounts of information with test cases available over a variety of software delivery versions. These test cases also have relationships between them in that they cover almost all courses of test cases.

Whenever a released version of a product or a project is taken up for changes/enhancements, impact analysis based on work requests is the driving force. This analysis is performed using the impact analysis module 702. Impact analysis refers to analyzing the changes picking up the affected released set of software artifacts. Impact analysis is done with the released set of software artifacts that form the hierarchy of business operations.

Once impact analysis is over, test plan generation begins with development in parallel. A lead test engineer and a project manager are allowed to look at setting up the system/unit test plan looking at the list of things that are being developed. One advantage with the system is that once impact analysis is over, all the related test cases provided over a set of versions that cover the impacted artifact with respect to each event or the lower level artifact are picked up and made available for testing using the impacted artifact test definition module 704.

This impacted artifact test case becomes a mandatory test case repository for setting up the test execution plan. The choice of finalizing the sufficient and complete list of test cases for the chosen release, based on impact analysis wrests with the lead test engineer and/or project manager who is aware of his/her list of test cases given to him/her as the base.

Additional test cases may also be provided in addition to this main list or repository of test cases. These additional test cases are defined using the user defined test definition module 706. The added list of case(s) henceforth forms the base list of cases automatically on re-work with the same component or it's down the line artifact for which this test case is associated.

The added advantage of impact analysis over testing is that statistics of how many times this component artifact was released and on all these cases how many of the test cases are used more number of times shall be provided for the benefit of the user to add/delete it to his test execution sequence for the current release suggested. All possible options of the basic course/alternate course mix is provided with the user getting as much support to decide and provide a robust test plan. The ultimate aim of providing the blended mix for satisfactory test creation and execution of the component to be released is achieved in this approach. Whenever an integration issue is handled in this impact, the necessary integration test cases (mandatory) are tested without fail, with creation of integration information between components as interface between the components getting affected.

Figure 8:
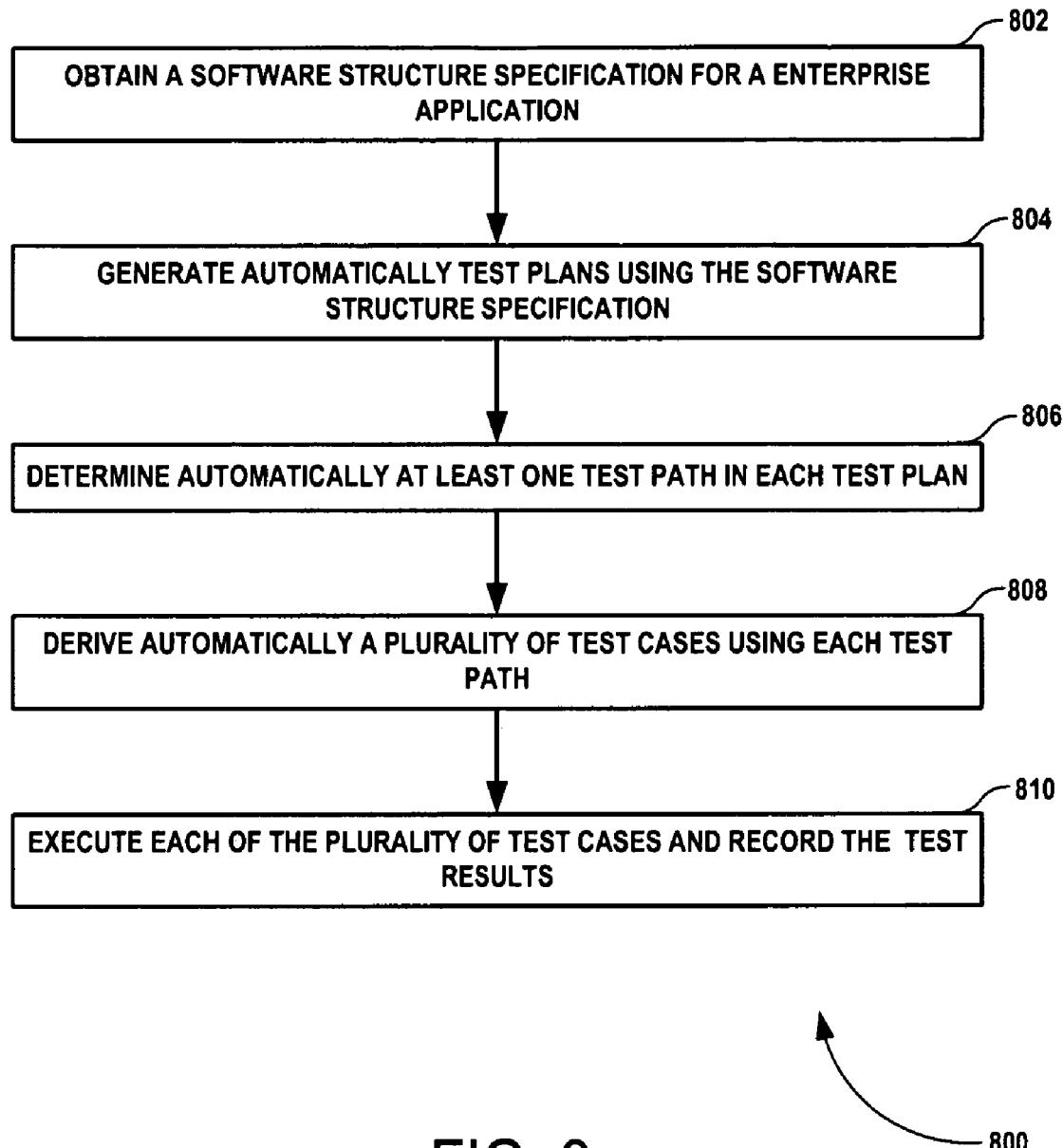
FIG. 8 is a process flowchart illustrating a method for testing a software development activity for an enterprise application, in accordance with one example embodiment of the present invention.

FIG. 8 is a process flowchart 800 illustrating a method for testing a software development activity for an enterprise application in accordance with one example embodiment of the present invention. In operation 802, software structure specification for the enterprise application residing in a memory of a server is obtained. The software structure specification includes process flow specifications for each of a plurality of business processes at first level, design architecture specifications of components associated with each of the plurality of business processes at second level, and customization specifications of user interfaces for providing services associated with each of the components at third level.

In operation 804, test plans associated with testing of the software development activity are automatically generated using the software structure specification. In operation 806, at least one test path is automatically determined in each test plan using the software structure specification. In operation 808, a plurality of test cases for testing the software development activity are automatically derived using each test path.

In operation 810, each of the plurality of test cases are executed and test results are recorded.

Figure 9A:
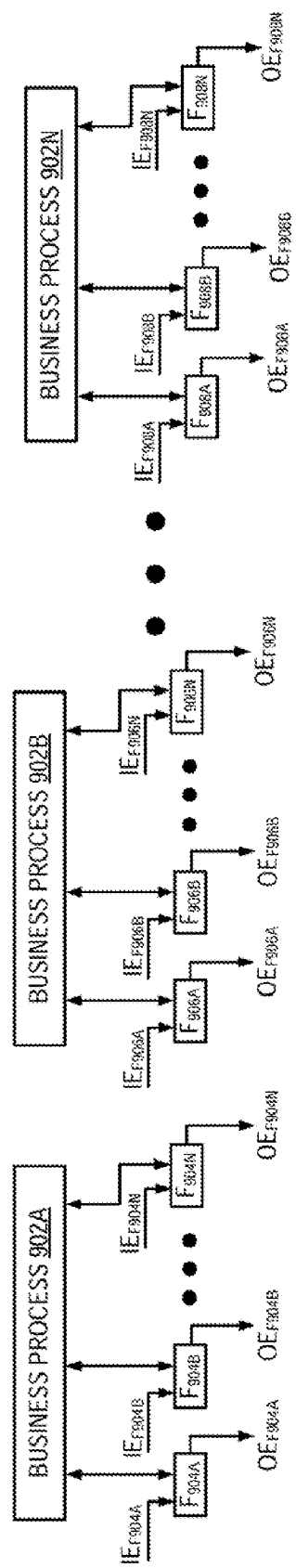
FIG. 9A is a schematic diagram illustrating elements at a system or business process level for which testing is to be performed based on automatically generated test cases.

FIG. 9A is a schematic diagram illustrating elements at a system or business process level for which testing is to be performed based on automatically generated test cases. Particularly, FIG. 9A illustrates business processes 902A-N. The business process 902A, the business process 902B and the business process 902N is associated with business functions 904A-N, business functions 906A-N and business functions 908A-N, respectively. Each business function associated with a business process is configured to receive an input event (IE) and generate an output event (OE).

The input event may be referred to as a stimulus to a particular business function and the output event may be referred as a response generated by the particular business function. Thus, a test plan may be a stimulus-response combination across the business processes 902A-N at the system level. In other words, the test plan may be defined as a plan which considers a stimulus ($IE_{F904A}$) to the business function 904A associated with the business process 902A and a response ($OE_{F908N}$) generated by the business function 908N of the business process 902N.

Further, the test plan may include one or more test paths that are identified for testing a software development activity of an enterprise application at the system level. Each test path may be a sequence of stimulus-response combination within and across the business processes 902A-N. For example, the test path may be based on stimulus-response combinations associated with a set of associated business functions of one or more business processes 902A-N. Exemplary test path determined based on the test plan may be: $IE_{F904A}$->F904A->$OE_{F904A}$->$IE_{F904B}$->F904B->$OE_{F904B}$->$IE_{F906N}$->F906N->$OE_{F906N}$->$IE_{F908N}$->F908N->$OE_{F908N}$.

Each test path in the test plan includes one or more test cases which are used to test one or more business functions associated with one or more business processes. In general, a test case in a test path may be defined as a stimulus-response combination associated with a business function of a business process. Exemplary test cases generated using the above test path may include: a) $IE_{F904A}$->F904A->$OE_{F904A}$, b) $IE_{F904B}$->F904B->$OE_{F04B}$, c) $IE_{F906N}$->F906N->$OE_{F06N}$ and d) $IE_{F08N}$->F908N->$OE_{F908N}$.

According to an embodiment of the present invention, the software testing module 206 enables automatic generation of a test plan, one or more test paths and one or more test cases based on the business processes 902A-N associated with business functions in a software structure specification (e.g., the software structure specification 100 of FIG. 1A) stored in a software database (e.g., the software database 208 of FIG. 2). Further, based on the test cases generated at the system level, the software testing module 206 tests the software development activity by executing one or more of the test cases.

Figure 9B:
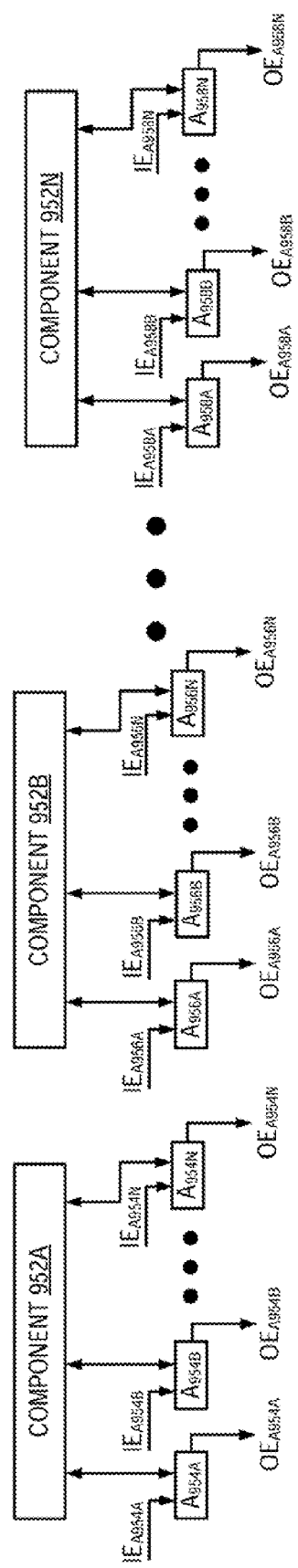
FIG. 9B is a schematic diagram illustrating elements at an integrated services or component level for which testing is to be performed based on automatically generated test cases.

FIG. 9B is a schematic diagram illustrating elements at an integrated services or component level for which testing is to be performed based on automatically generated test cases. Particularly, FIG. 9B illustrates components 952A-N. The component 952A, the component 952B and the component 952N is associated with business activities 954A-N, business activities 956A-N and business activities 958A-N, respectively.

Each business activity associated with a component is configured to receive an input event (IE) and generate an output event (OE). The input event may be referred to as a stimulus to a particular business activity and the output event may be referred to as a response generated by the particular business activity. Thus, a test plan may be a stimulus-response combination across the components 952A-N at the integrated services level. In other words, the test plan may be defined as a plan which considers a stimulus ($IE_{A954A}$) to the business activity 954A associated with the component 952A and a response ($OE_{A958N}$) generated by the business activity 958N of the component 952N.

Further, the test plan may include one or more test paths that are identified for testing a software development activity of an enterprise application at the integrated services level. Each test path may be a sequence of stimulus-response combination within and across the components 952A-N. For example, the test path may be based on stimulus-response combinations associated with a set of associated business activities of one or more components 952A-N. Exemplary test path determined based on the test plan may be: $IE_{A954A}$->A954A->$OE_{A954A}$->$IE_{A954B}$->A954B->$OE_{A954B}$->$IE_{A956N}$->A956N->$OE_{A956N}$->$IE_{A958N}$->A958N->$OE_{A958N}$.

Each test path in the test plan includes one or more test cases which are used to test one or more business activities associated with one or more components. In general, a test case in a test path may be defined as a stimulus-response combination associated with a business activity of a component. Exemplary test cases generated using the above test path are: a) $IE_{A954A}$->A954A->$OE_{A954A}$, b) $IE_{A954B}$->A954B->$OE_{A954B}$, c) $IE_{A956N}$->A956N->$OE_{A9506N}$ and d) $IE_{A958N}$->A958N->$OE_{A958N}$.

According to an embodiment of the present invention, the software testing module 206 enables automatic generation of a test plan, one or more test paths and one or more test cases based on the components 952A-N with associated business activities in a software structure specification (e.g., the software structure specification 100 of FIG. 1A) stored in a software database (e.g., the software database 208 of FIG. 2). Further, based on the test cases generated at the integrated services level, the software testing module 206 tests the software development activity by executing one or more of the test cases.

Figure 9C:
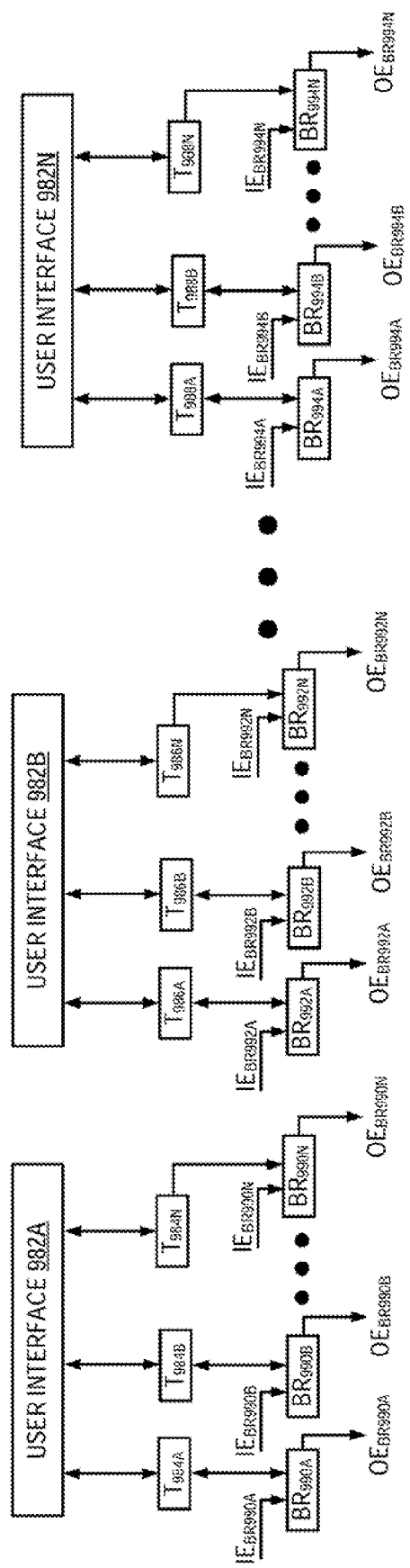
FIG. 9C is a schematic diagram illustrating elements at a unit or user interface level for which testing is to be performed based on automatically generated test cases.

FIG. 9C is a schematic diagram illustrating elements at a unit or user interface level for which testing is to be performed based on automatically generated test cases. Particularly, FIG. 9C illustrates user interfaces 982A-N. The user interface 982A, the user interface 982B and the user interface 982N is associated with business tasks 984A-N, business tasks 986A-N and business tasks 988A-N, respectively. Further, each business task is associated with a business rule (e.g., business rules 990A-N, business rules 992A-N and business rules 994A-N). It is appreciated that, a single business task may be associated with more than one business rules.

Each business rule associated with a business task is configured to receive an input event (IE) and generate an output event (OE). The input event may be referred to as a stimulus to a particular business rule and the output event may be referred as a response generated by the particular business rule. Thus, a test plan may be a stimulus-response combination across the user interfaces 982A-N at the unit level. In other words, the test plan may be defined as a plan which considers a stimulus ($IE_{BR984A}$) to the business rule 990A associated with the user interface 982A and a response ($OE_{BR994N}$) generated by the business rule 994N of the user interface 982N.

Further, the test plan may include one or more test paths that are identified for testing a software development activity of an enterprise application at the unit level. Each test path may be a sequence of stimulus-response combination within and across the user interface 982A-N. For example, the test path may be based on stimulus-response combinations associated with a set of associated business rules of one or more user interfaces 982A-N. Exemplary test path determined based on the test plan is: $IE_{BR99OA}$->BR990A->$OE_{BR99OA}$->$IE_{BR99OB}$->BR990B->$OE_{BR99OB}$->$IE_{BR992N}$->BR992N->$OE_{BR992N}$->$IE_{BR994N}$->BR994N->$OE_{BR994N}$.

Each test path in the test plan includes one or more test cases which are used to test one or more business rules associated with one or more user interfaces. In general, a test case in a test path may be defined as a stimulus-response combination associated with a business task of a user interface. Exemplary test cases generated using the above test path are: a) $IE_{BR99OA}$->BR990A->$OE_{BR99OA}$, b) $IE_{BR99OB}$->BR990B->$OE_{BR99OB}$, c) $IE_{BR992N}$->BR992N->$OE_{BR992N}$, d) $IE_{BR994N}$->BR994N->$OE_{BR994N}$. According to an embodiment of the present invention, the software testing module 206 enables automatic generation of a test plan, one or more test paths and one or more test cases based on the user interfaces 982A-N associated with business rules in a software structure specification (e.g., the software structure specification 100 of FIG. 1A) stored in a software database (e.g., the software database 208 of FIG. 2). Further, based on the test cases generated at the unit level, the software testing module 206 tests the software development activity by executing one or more of the test cases.

Figure 10A:
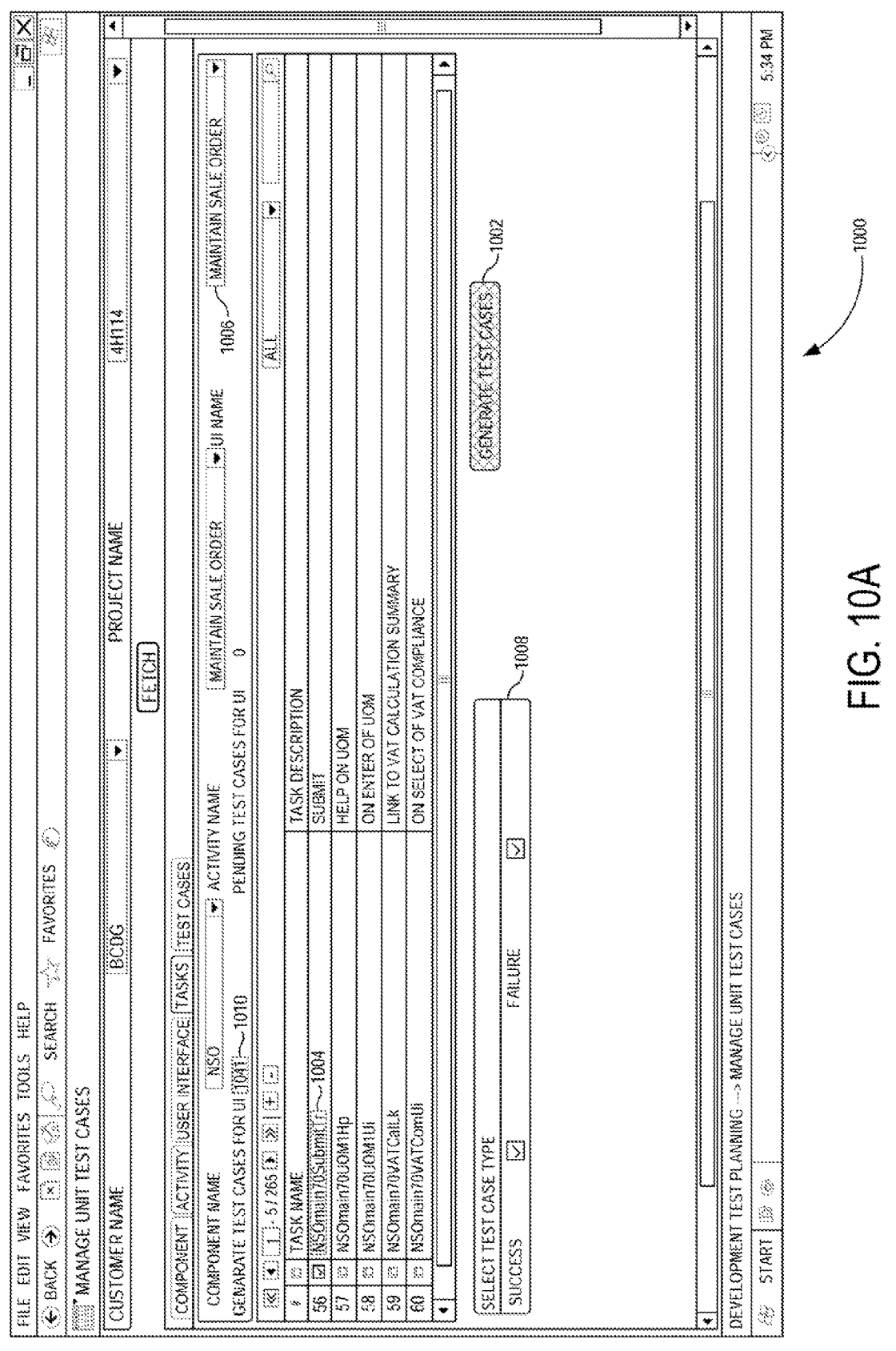

FIG. 10A is a user interface view 1000 showing generation of test cases associated with a test path at a user interface level in accordance with one example embodiment of the present invention. The user interface view 1000 enables automatic generation of test cases associated with each level (e.g., a system level, integrated services level and unit level) using a generate test cases button 1002. In one embodiment, the test cases are automatically generated by the automated test cases generation module 220 of FIG. 2.

In another embodiment, the test cases associated with the tasks are automatically generated based on an associated test path associated with a test plan generated using the software structure specification 100 of FIG. 1A. In the example embodiment illustrated in FIG. 10A, the generate test cases button 1002 enables automatic generation of test cases associated with a task 1004 "NSOmain70submitTr" of a user interface 1006 "maintain sale order". Also, the user interface view 1000 facilitates generation of the test cases based on test case types 1008 such as "success" and "failure". As illustrated, number of test cases generated for the task using the generate test cases button 1002 are "1041" (reference numeral 1010).

Figure 10B:
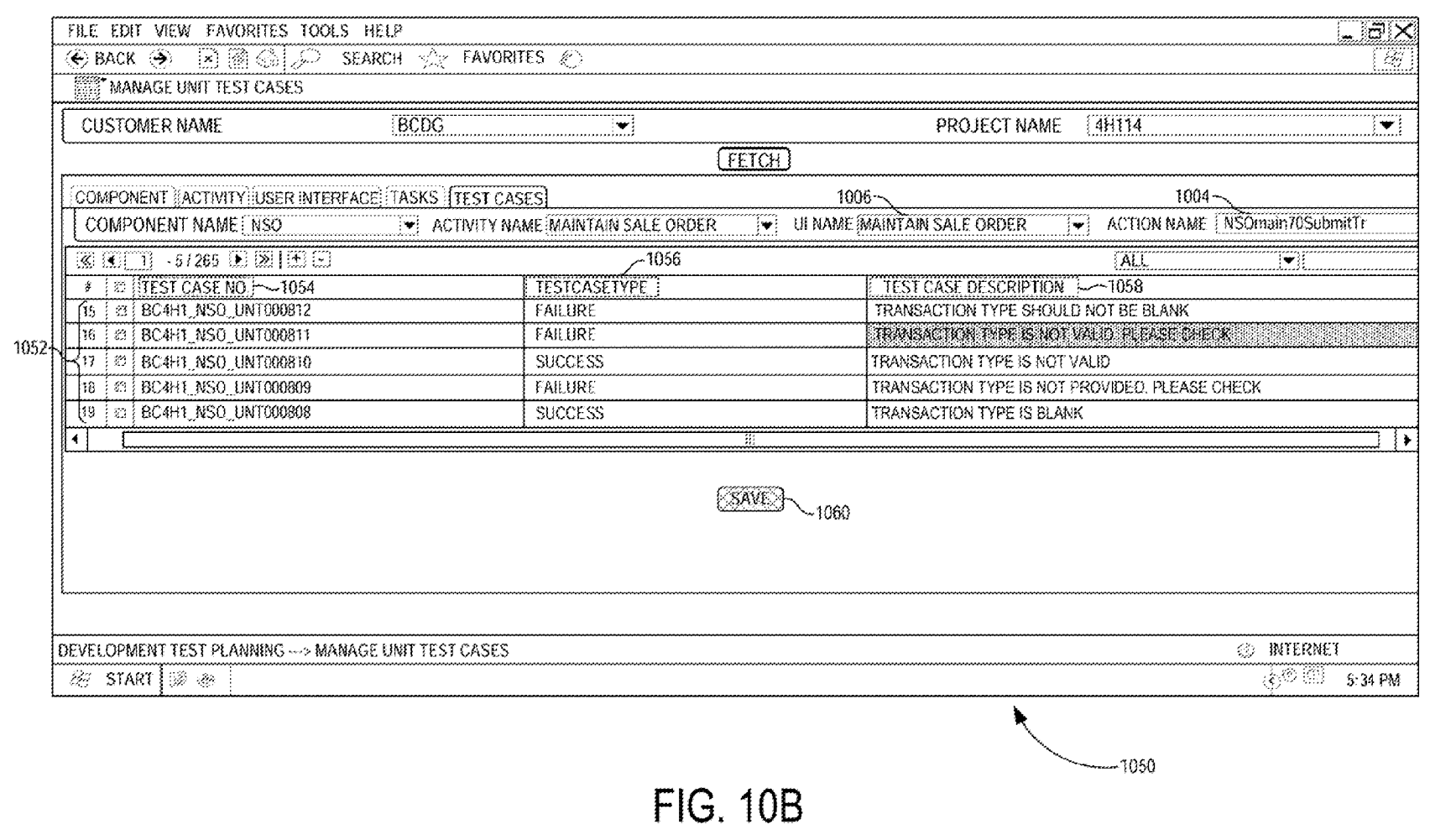

FIG. 10B is a user interface view 1050 for managing of the automatically generated test cases at each level in accordance with one example embodiment of the present invention. As illustrated, the user interface view 1050 displays the test cases 1052 associated with the task 1004 at a unit level. The user interface view 1050 displays a test case no. field 1054, a test case type field 1056 and a test case description field 1058 and a save button 1060. The test case no. field 1054 displays a unique identifier associated with each test case associated with each task of a user interface. The test case type field 1056 displays a type associated with each of the generated test cases displayed in the test case no. field 1054. The test case description field 1058 displays a description associated with each of the generated test cases. For example, the description associated with said each of the generated test cases may include additional info which indicates significance of each test case. The save button 1060 enables storing the automatically generated test cases selected by the user in the software database 208.

In the example embodiment illustrated in FIG. 10B, the user interface view 1050 displays test cases associated with the task 1004 "NSOmain70submitTr" of the UI 1006 "maintain sale order". The test case no. field 1054 displays the unique identifier associated with each test case as "BCD4H1_NSO_UNT000812", "BCD4H1_NSO_UNT000811", "BCD4H1_NSO_UNT000810" and so on. The test case type field 1056 displays the type associated with the test cases as "failure" or "success". The test case description field 1058 displays the description associated with the test cases as "transaction type should not be blank", "transaction type is not valid. Please check", "transaction type is not provided. Please check" and so on.

Figure 10C:
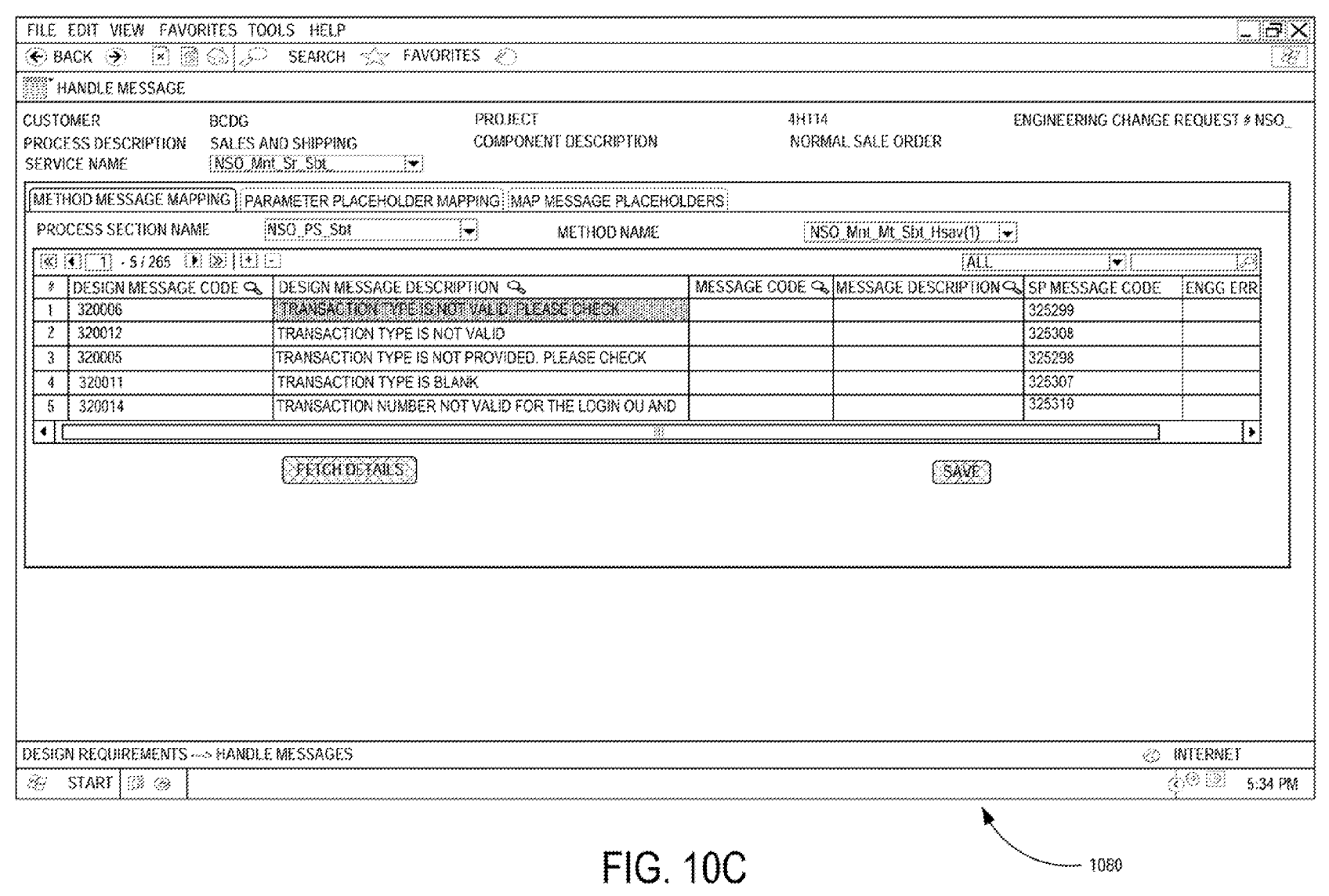

FIG. 10C is a user interface view 1080 showing results of testing operations using automatically generated test cases in accordance with one example embodiment of the present invention. Particularly, FIG. 10C shows results (e.g., error conditions) obtained after executing the automatically generated test cases. In the example embodiment illustrated in FIG. 10C, the user interface view 1080 displays results as "transaction type is not valid. Please check", "transaction type is not provided. Please check", "transaction number not valid for the login OU" and so on.

Figure 11:
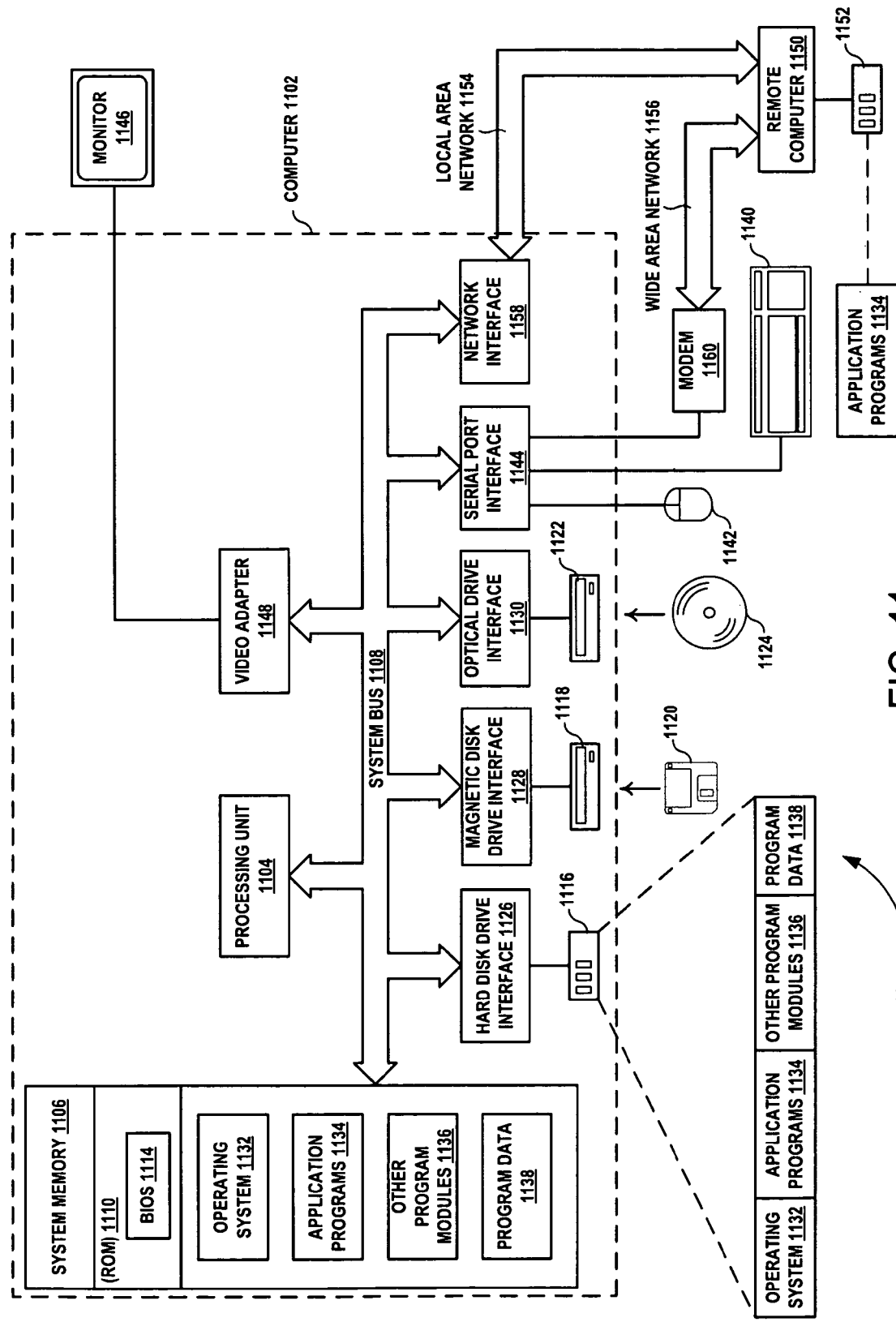
FIG. 11 is an overview diagram of a hardware and operating environment in conjunction with which embodiments of the invention may be practiced.

FIG. 11 is an overview diagram of a hardware and operating environment in conjunction with which embodiments of the invention may be practiced. The description of FIG. 11 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types. In the embodiment shown in FIG. 11, a hardware and operating environment is provided that is applicable to any of the servers and/or remote clients shown in the other Figures.

As shown in FIG. 11, one embodiment of the hardware and operating environment includes a general purpose computing device in the form of a computer 1102 (e.g., a personal computer, workstation, or server), including one or more processing units 1104, a system memory 1106, and a system bus 1108 that operatively couples various system components including the system memory 1106 to the processing unit 1104. There may be only one or there may be more than one processing unit 1104, such that the processor of the computer 1102 comprises a single central-processing unit (CPU), or a plurality of processing units, commonly referred to as a multiprocessor or parallel-processor environment. In various embodiments, the computer 1102 is a conventional computer, a distributed computer, or any other type of computer.

The system bus 1108 can be any of several types of bus structures including a memory bus or memory controller, a peripheral bus, and a local bus using any of a variety of bus architectures. The system memory 1106 can also be referred to as simply the memory, and, in some embodiments, includes read-only memory (ROM) 1110 and random-access memory (RAM) 1112. A basic input/output system (BIOS) program 1114, containing the basic routines that help to transfer information between elements within the computer 1102, such as during start-up, may be stored in the ROM 1110. The computer 1102 further includes a hard disk drive 1116 for reading from and writing to a hard disk, not shown, a magnetic disk drive 1118 for reading from or writing to a removable magnetic disk 1120, and an optical disk drive 1122 for reading from or writing to a removable optical disk 1124 such as a CD ROM or other optical media.

The hard disk drive 1116, the magnetic disk drive 1118, and the optical disk drive 1122 couple with a hard disk drive interface 1126, a magnetic disk drive interface 1128, and an optical disk drive interface 1130, respectively. The drives and their associated computer-readable media provide non volatile storage of computer-readable instructions, data structures, program modules and other data for the computer 1102. It should be appreciated by those skilled in the art that any type of computer-readable media which can store data that is accessible by the computer 1102, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk drive 1116, magnetic disk drive 1118, optical disk drive 1122, the ROM 1110, or the RAM 1112, including an operating system 1132, one or more application programs 1134, other program modules 1136, and program data 1138. A plug in containing a security transmission engine for the present invention can be resident on any one or number of these computer-readable media.

A user may enter commands and information into the computer 1102 through input devices such as a keyboard 1140 and a pointing device 1142. Other input devices (not shown) can include a microphone, a joystick, a game pad, a satellite dish, a scanner and the like. These other input devices are often connected to the processing unit 1104 through a serial port interface 1144 that is coupled to the system bus 1108, but can be connected through other interfaces, such as a parallel port, game port, or a universal serial bus (USB). A monitor 1146 or other type of display device can also be connected to the system bus 1108 via an interface, such as a video adapter 1148. The monitor 1146 can display a graphical user interface for the user. In addition to the monitor 1146, computers typically include other peripheral output devices (not shown), such as speakers and printers.

The computer 1102 may operate in a networked environment using logical connections to one or more remote computers or servers, such as a remote computer 1150. These logical connections are achieved by a communication device coupled to or a part of the computer 1102; the invention is not limited to a particular type of communications device. The remote computer 1150 can be another computer, a server, a router, a network PC, a client device, a peer device or other common network node, and typically includes many or all of the elements described above I/O relative to the computer 1102, although only a memory storage device 1152 has been illustrated. The logical connections depicted in FIG. 11 include a local area network (LAN) 1154 and/or a wide area network (WAN) 1156. Such networking environments are common place in office networks, enterprise-wide computer networks, intranets and the internet which are all types of networks.

When used in a LAN-networking environment, the computer 1102 is connected to the LAN 1154 through a network interface or adapter 1158, which is one type of communications device. In some embodiments, when used in a WAN-networking environment, the computer 1102 typically includes a modem 1160 (another type of communications device) or any other type of communications device, e.g., a wireless transceiver, for establishing communications over the WAN 1156, such as the Internet. The modem 1160, which may be internal or external, is connected to the system bus 1108 via the serial port interface 1144.

In a networked environment, program modules depicted relative to the computer 1102 can be stored in the remote memory storage device 1152 of the remote computer or server 1150. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, a method and system to perform planning and performing testing for software modules within an automated development system have been described. In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for testing software development activity within an enterprise application residing in a server, the method comprising:
    obtaining a software structure specification, residing in memory of the server, for the enterprise application, wherein the software structure specification comprises:
        business-software architecture of the enterprise application in a first level of the software structure specification modeled as business functions, business activities, forms, actions, and business rules, wherein each of the business functions comprises functions performed in a business process of the enterprise application, wherein each of the business activities comprises activities performed in each of the business functions, wherein each of the forms comprises semantics to capture and retrieve information for each of the business activities, wherein each of the actions comprises tasks performed in each of the forms, and wherein each of the business rules comprises rules that govern each of the actions;
        design architecture of the enterprise application in a second level of the software structure specification modeled as components, system entry points, user interfaces, services, and methods, wherein each of the components corresponds to each of the business functions of the business process, wherein each of the system entry points corresponds to visual-interface elements of each of the business activities, wherein each of the user interfaces with visual-interface elements corresponds to each of the forms, wherein each of the services corresponds to each of the actions performed in each of the user interfaces, and wherein each of the methods corresponds to each of the business rules that are invoked in handling each of the services;
        customization specifications of the user interfaces for providing services associated with each of the components at a third level;
        events that connect the first level and second level;
        links that represent interactions between the user interfaces; and
        integration services defined for each of the events, wherein each of the business functions, business activities, forms, actions, and business rules in the first level is mapped to a corresponding one of the components, system entry points, user interfaces, services, and methods in the second level using the events, links, and integration services;
    generating test plans using the software structure specification, wherein each test plan is a stimulus-response combinations across at least two business processes at the first level, at least two components at the second level, and at least two user interfaces at the third level;
    determining at least one test path in each test plan using the software structure specification, wherein each of the at least one test path is a sequence of stimulus-response combinations across and within at least two associated business processes at the first level, at least two associated components at the second level, and at least two associated user interfaces at the third level;
    automatically deriving a plurality of test cases using each test path, wherein each of the plurality of test cases is a case to test at least one combination of stimulus and response associated with each business process at the first level, component at the second level, and user interface at the third level; and
    executing each of the plurality of test cases to obtain test results and recording the test results in memory of the server.

2. The method of claim 1, further comprising deriving and executing test cases from the plurality of test cases for regression testing if modifications have been made to the software structure specification subsequent to completion of testing.

3. The method of claim 1, further comprising storing the plurality of test cases and the test results in software database of the server.

4. The method of claim 1, wherein the process flow specification of each business process comprises business functions associated with said each business process.

5. The method of claim 1, wherein the design architecture specification of each component comprises business activities associated with said each component.

6. The method of claim 1, wherein the customization specification of each user interface comprises business tasks associated with each user interface, and wherein each of the business tasks comprises business rules that govern said each of the business tasks, and wherein each of the business rules is associated with an error condition.

7. The method of claim 1, wherein the stimulus is an entry event and the response is an exit event.

8. The method of claim 1, wherein, in each test plan, known stimuli results in known response across at least two business processes at the first level, at least two components at the second level, and at least two user interfaces at the third level.

9. The method of claim 4, wherein each test plan comprises known stimuli to a business function of one business process resulting in known response from a business function of another business process.

10. The method of claim 9, wherein each of the at least one test path is a sequence of stimulus-response combinations across business functions between the at least two business processes.

11. The method of claim 10, wherein each test case is a case to test at least one combination of stimulus and response associated with a business function.

12. The method of claim 5, wherein each test plan comprises known stimuli to an business activity of one component resulting in known response of a business activity of another component.

13. The method of claim 12, wherein each of the at least one test path is a sequence of stimulus-response combinations across business activities between the at least two components.

14. The method of claim 13, wherein each test case is a case to test at least one combination of stimulus and response associated with a business activity.

15. The method of claim 6, wherein each test plan comprises known stimuli to a business task of one user interface resulting in known response of a business task of another user interface.

16. The method of claim 15, wherein each of the at least one test path is a sequence of stimulus-response combinations across business tasks between the least two user interfaces.

17. The method of claim 16, wherein each test case is a case to test at least one combination of stimulus and response associated with a business task.

18. The method of claim 1, wherein the events comprise entry events and exit events, and wherein each of the entry events is a stimulus that triggers a business function, a business activity, or a form and each of the exit events is a response from the respective business function, business activity, or form to the stimulus.

19. The method of claim 1, wherein each of the links comprises cross connections between the visual-interface elements in the user interfaces and the events associated with at least one the business functions, business activities, and forms.

20. The method of claim 1, wherein the integration services define cross connections for data updates between the events associated with at least one the business functions, business activities, and forms in the first level and services and methods in the second level.

21. A non-transitory computer-readable medium storing a set on instructions that, when executed by a computing platform, causes the computing platform to perform a method for testing a software development activity within an enterprise application, the method comprising:

obtaining a software structure specification for the enterprise application, wherein the software structure specification comprises: business-software architecture of the enterprise application in a first level of the software structure specification modeled as business functions, business activities, forms, actions, and business rules, wherein each of the business functions comprises functions performed in a business process of the enterprise application, wherein each of the business activities comprises activities performed in each of the business functions, wherein each of the forms comprises semantics to capture and retrieve information for each of the business activities, wherein each of the actions comprises tasks performed in each of the forms, and wherein each of the business rules comprises rules that govern each of the actions;

design architecture of the enterprise application in a second level of the software structure specification modeled as components, system entry points, user interfaces, services, and methods, wherein each of the components corresponds to each of the business functions of the business process, wherein each of the system entry points corresponds to visual-interface elements of each of the business activities, wherein each of the user interfaces with visual-interface elements corresponds to each of the forms, wherein each of the services corresponds to each of the actions performed in each of the user interfaces, and wherein each of the methods corresponds to each of the business rules that are invoked in handling each of the services;

customization specifications of the user interfaces for providing services associated with each of the components at a third level;

events that connect the first level and second level;

links that represent interactions between the user interfaces; and integration services defined for each of the events, wherein each of the business functions, business activities, forms, actions, and business rules in the first level is mapped to a corresponding one of the components, system entry points, user interfaces, services, and methods in the second level using the events, links, and integration services;

generating test plans using the software structure specification, wherein each test plan is a stimulus-response combinations across at least two business processes at the first level, at least two components at the second level, and at least two user interfaces at the third level;

determining at least one test path in each test plan using the software structure specification, wherein each of the at least one test path is a sequence of stimulus response combinations across and within at least two associated business processes at the first level, at least two associated components at the second level, and at least two associated user interfaces at the third level;

automatically deriving a plurality of test cases using each test path, wherein each of the plurality of test cases is a case to test at least one combination of stimulus and response associated with each business process at the first level, component at the second level, and user interface at the third level; and executing each of the plurality of test cases to obtain test results and recording the test results.

22. A system for testing software development activity within an enterprise application, the system comprising:

a server; and a plurality of client devices coupled to the server via a network, wherein the server comprises:

a processor;

a memory coupled to the processor, wherein the memory comprises:
  a software database for storing a software structure specification of the enterprise application, wherein the software structure specification comprises:
  business processes at a second level, and customization specifications of user interfaces business-software architecture of the enterprise application in a first level of the software structure specification modeled as business functions, business activities, forms, actions, and business rules, wherein each of the business functions comprises functions performed in a business process of the enterprise application, wherein each of the business activities comprises activities performed in each of the business functions, wherein each of the forms comprises semantics to capture and retrieve information for each of the business activities, wherein each of the actions comprises tasks performed in each of the forms, and wherein each of the business rules comprises rules that govern each of the actions;
  design architecture of the enterprise application in a second level of the software structure specification modeled as components, system entry points, user interfaces, services, and methods, wherein each of the components corresponds to each of the business functions of the business process, wherein each of the system entry points corresponds to visual-interface elements of each of the business activities, wherein each of the user interfaces with visual-interface elements corresponds to each of the forms, wherein each of the services corresponds to each of the actions performed in each of the user interfaces, and wherein each of the methods corresponds to each of the business rules that are invoked in handling each of the services;
  customization specifications of the user interfaces for providing services associated with each of the components at a third level;
  events that connect the first level and second level;
  links that represent interactions between the user interfaces; and
  integration services defined for each of the events, wherein each of the business functions, business activities, forms, actions, and business rules in the first level is mapped to a corresponding one of the components, system entry points, user interfaces, services, and methods in the second level using the events, links, and integration services;
  a software coding module configured to generate testing applications and related software modules using the software structure specification; and
  a software testing module for providing an integrated testing environment within the system for testing software development activity, wherein the software testing module comprises:
    a test plan generation module configured to generate a plurality of test plans based upon information in the software structure specification, wherein each test plan is a stimulus-response combinations across at least two business processes at the first level, at least two components at the second level, and at least two user interfaces at the third level;
    a test case generation module configured to generate at least one test path from each of the plurality of test plans and automatically generate a plurality of test cases from each of the at least one test path, wherein each of the at least one test path is a sequence of stimulus-response combinations across and within at least two associated business processes at the first level, at least two associated components at the second level, and at least two associated user interfaces at the third level, and wherein each of the plurality of test cases is a case to test at least one combination of stimulus and response associated with each business process at the first level, component at the second level, and user interface at the third level; and
    a test case execution and analysis module configured to execute each of the plurality of test cases to obtain test results and record the test results in the software database.

23. The system of claim 22, further comprising a regression test module for deriving and executing test cases from the plurality of test cases for regression testing if modifications have been made to software module specification subsequent to completion of testing.

* * * * *